United States Patent
Kope

(10) Patent No.: US 12,552,208 B2
(45) Date of Patent: Feb. 17, 2026

(54) TOW DOLLY MOUNT APPARATUS

(71) Applicant: Paul E. Kope, Camden, DE (US)

(72) Inventor: Paul E. Kope, Camden, DE (US)

( * ) Notice: Subject to any disclaimer, the term of this patent is extended or adjusted under 35 U.S.C. 154(b) by 370 days.

(21) Appl. No.: 18/174,822

(22) Filed: Feb. 27, 2023

(65) Prior Publication Data

US 2024/0286444 A1  Aug. 29, 2024

(51) Int. Cl.
*B60D 1/14* (2006.01)
*B60D 1/155* (2006.01)

(52) U.S. Cl.
CPC .............. *B60D 1/143* (2013.01); *B60D 1/155* (2013.01)

(58) Field of Classification Search
CPC ........... B60D 1/14; B60D 1/143; B60D 1/155
USPC ........................................................ 414/620
See application file for complete search history.

(56) References Cited

U.S. PATENT DOCUMENTS

| | | | |
|---|---|---|---|
| 2,082,663 A * | 6/1937 | Slater | B60P 1/6454 |
| | | | 193/38 |
| 4,258,967 A | 3/1981 | Boudreau | |
| 5,209,628 A | 5/1993 | Hassell | |
| 5,338,146 A * | 8/1994 | Hindt | B60P 3/12 |
| | | | 414/547 |
| 5,346,357 A | 9/1994 | Hassell | |
| 7,033,128 B2 * | 4/2006 | Poindexter | B60P 1/4414 |
| | | | 414/544 |
| 7,661,777 B2 | 2/2010 | Ceccarelli | |
| 8,016,539 B1 * | 9/2011 | Potter | B60D 1/155 |
| | | | 414/467 |
| D1,054,332 S * | 12/2024 | Kope | D12/162 |
| 12,280,276 B2 * | 4/2025 | Ziaylek | A62B 25/00 |
| 2002/0114688 A1 * | 8/2002 | Poindexter | B60P 1/16 |
| | | | 414/477 |
| 2002/0136621 A1 * | 9/2002 | Scherle | B60P 1/433 |
| | | | 414/480 |
| 2004/0130247 A1 | 7/2004 | Model | |
| 2016/0052458 A1 * | 2/2016 | Cha | B60R 9/06 |
| | | | 414/462 |
| 2021/0354633 A1 * | 11/2021 | Cowan | A47B 46/005 |
| 2022/0339476 A1 * | 10/2022 | Ziaylek | A62B 25/00 |

FOREIGN PATENT DOCUMENTS

EP  0741071 B1  6/1996

* cited by examiner

*Primary Examiner* — Joseph C Rodriguez

(57) ABSTRACT

An apparatus for storing and unloading a tow dolly used for towing automotive vehicles. The apparatus comprises a support leg that is mounted on a towing vehicle. A base frame is rigidly connected to the support leg. A sliding section is operably connected to the base frame. The sliding section extends and lowers a pivotally connected head section away and down from the truck bed into a more accessible unloading/loading position. The tow dolly is releasably attached to the head section and can be secured with a locking mechanism.

19 Claims, 16 Drawing Sheets

TOW DOLLY MOUNT APPARATUS

FIELD OF THE INVENTION

The present invention relates generally to mounting device and more particularly to mounting devices having a sliding extension with a pivotally mounted carrier section designed for the unloading and loading of a tow dolly of different weights.

BACKGROUND OF THE INVENTION

Motor vehicles become disable for a variety of reasons due to mechanical failures or collisions with other motor vehicles or structures along the road. At these time it is necessary to remove them from the road by other means other than under the motor vehicles own power. There are numerous ways to do this. For example, pushing the car is one way to accomplish this. The more common way to do this is by towing the car in some fashion. There are ropes, straps, bars, and dollies for this whether they are privately owned by the motor vehicle owner or by an acquaintance. There are also commercial towing companies. The towing companies are the most competent at this activity. They have numerous tools to accomplish this depending on the motor vehicle type or the situation. One tool employed by the towing companies are tow dollies. The two dollies consist of a linear double wheel apparatus that works in pairs. The tow dolly apparatus allows for the motor vehicle to be safely towed to a nearby automotive mechanic's shop or the motor vehicle owners house.

The tow dolly apparatus is quite heavy and cumbersome. A single linear wheel section weighs up to 100 pounds or more. This can be tiring and sometimes difficult for the operator to repeatedly lift the tow dolly sections in or out of the tow truck bed.

An objective of the present invention is to provide an apparatus for storing a tow dolly during transport to a disabled vehicle. The present invention can have a plurality of locking mechanisms to safely store the different components in their storage positions and to easily unlock for moving into the different components unloading position.

An objective of the present invention is to provide an apparatus for storing or lowering the tow dolly for removal from the tow truck to be use in towing a disabled motor vehicle to a desired location. There are multiple stages of lowering the dolly that assists in avoiding back and other injuries.

A further objective of the present invention is to provide a durable and sturdy apparatus that can withstand the arduous operation of the towing profession. The materials and methods for joining the components are well known for their durability and strength.

SUMMARY OF THE INVENTION

The present invention comprises a stand for mounting the base frame, the sliding section, and the head section. The stand is usually a single column frame that can support the weight of the components and the tow dolly. The base frame supports the operating component sections and houses the component sections for storage of the tow dolly. The sliding section assists in extending the tow dolly away from the truck bed to be able to avoid climbing into the truck bed or reverses for storing the tow dolly. There is also a slight forward tilt to begin lowering the dolly closer to the ground for unloading or reversing and raising the tow dolly for storage. The head section holds the tow dolly and pivots up and down for dropping the tow dolly to a height above the ground that the operator can comfortably unload the dolly. There are multiple handles for assisting in moving the different sections for different stages of unloading and loading the tow dolly.

DETAIL DESCRIPTIONS OF THE INVENTION

Figure 1:
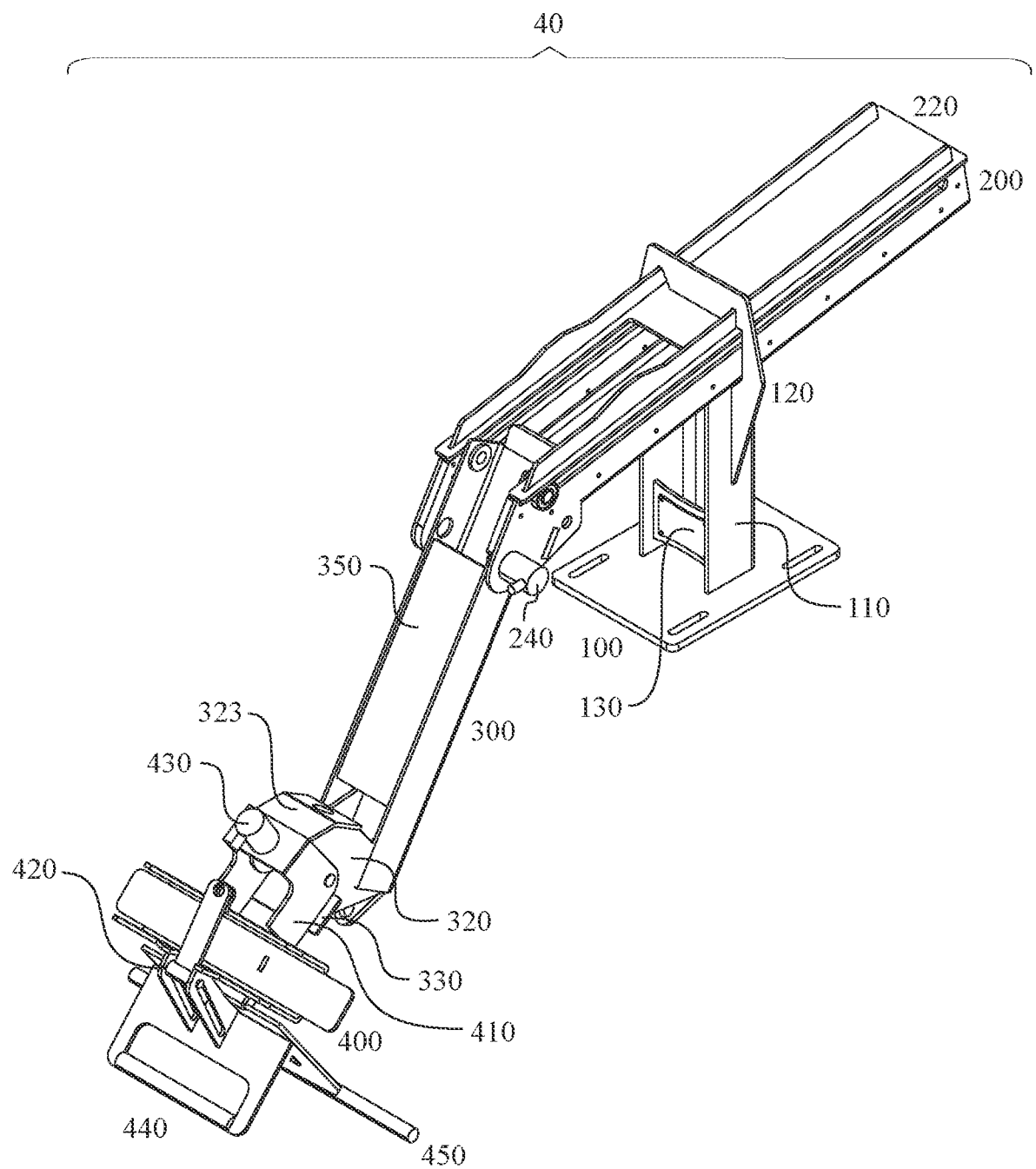
FIG. 1 is a top front perspective view of the present invention in unloading position.

All illustrations of the drawings are for the purpose of describing selected versions of the present invention and are not intended to limit the scope of the present invention.

The specification includes references to "alternative embodiment" or "alternative embodiments" which do not necessarily refer to the same embodiment.

"First", "second" etc. as contained herein are terms used as labels for nouns that they precede and do not imply ordering.

The term "plate" is used herein to refer to a flat, planar object as described.

Referring now to the drawings, a tow dolly mount 40, as shown in FIGS. 1-10, comprises a stand section 41, a base main frame 50, a sliding section 60, and a head section 70. The stand section 41 comprises a mounting platform 100 and at least one support leg 110, and an attachment support frame 120. The base main frame 50 comprises a top main plate 220, a main support frame 200, and a sliding section stopper plate 280. The sliding section 70 comprises a sliding support frame 300, a sliding mechanism 310, a head section stopper plate 330, and a sliding section bracket 320 to pivotally engage with a head section bracket 410. The head section comprises a main trough 400, and the head section bracket 410 to pivotally engage with the sliding section bracket 320, and a head section locking mechanism 430. The tow dolly mount comprises a truck side or the side that generally faces toward a motor vehicle, a dolly side which is opposite of the truck side and is the side where a tow dolly is stored or unloaded, a forward side or the side that faces toward the front of the motor vehicle and a back side which faces the back of the motor vehicle.

Referring to FIGS. 1-5, the mounting platform 100 of the stand section 41 comprises a generally flat first plate body. In a first preferred embodiment, the flat first plate body is generally rectangular in shape but not limited to this shape. The mounting platform 100 comprises a top platform side and a bottom platform side, a plurality of mounting slots, and a plurality of mounting fasteners. The mounting platform can have the plurality of mounting slots around the periphery of the mounting platform in any pattern useful for mounting the mounting platform 100 to a surface. The mounting platform 100 can be fastened with the mounting fasteners to a motor vehicle frame with the bottom platform side facing the towing vehicle and mating with a surface of the towing vehicle. The mounting fasteners can be bolt and nut or similar items. The motor vehicle frame is one adapted for towing automotives. The mounting platform 100 is preferably installed in a generally horizontal plane with a generally horizontal surface of a motor vehicle frame. The support leg 110 is generally vertical with a base leg side and a top leg side, and the base leg side is attached preferably by welding or similar securement and generally perpendicular to the top platform side in a generally central location. The main support frame 200 comprises a main support floor panel 217, a left guide rail 212 and a right guide rail 213 in a contiguous piece forming a u-shape channel, a plurality of guide fastener holes 2131, and a plurality of guide fasteners 2130. The main support floor panel 217 comprises a first top side and a first bottom side. The top leg side is attached to the first bottom side. In the first preferred embodiment, the support leg 110 is preferably made of c-channel but is not limited to this. In alternative embodiments, the support leg 110 can be made of square tubing or similar material with enough structurally strength to hold the weight of the tow dolly mount components and tow dolly. In the first preferred embodiment, the stand section 110 comprises a support cross brace 130 that is welded to the support leg 110 between a first left and a first right lateral sides of the c-channel generally parallel to a support back panel of the c-shape support leg 110. The attachment support frame 120 is made of a contiguous second plate body, with an attachment support frame outer edge and an attachment support frame inner edge, that attaches to the stand section 41 and the base main frame 50 in a generally vertical plane. It is attached by welding or similar securement. The attachment support frame outer edge is generally polygonal in shape with five sides. The attachment support frame outer edge comprises at least four attachment support frame outer edge sides and an opening to engage the standing section support leg. The attachment support frame inner edge is shaped to engage the stand section 41 and the base main frame 50, so the attachment support inner edge is within tolerance of the stand section 41 and the base main frame 50 to be welded or similar securement to said components. The attachment support frame 120 adds structural strength to a junction between the stand section 41 and the base main frame 50.

Referring to FIGS. 1-7 and FIGS. 11 and 12, the top main plate 220 of the base main frame 200 comprises a third plate body in a generally rectangular shape having a left lateral side elongated extension and a right lateral elongated extension forming an inner plate cavity for the head section 70 storage operability, a top plate side, a bottom plate side, a forward plate side, a back plate side, a left plate side, and a right plate side. The top main plate 220 comprises said shape with a first top plate slot along the periphery of the top plate left side and a second top plate slot along the periphery of the right plate side. In the first preferred embodiment, the main support frame 200 comprises a contiguous piece of material with the left 212 and right 213 guide rails and the main support floor panel 217. The main support floor panel 217 comprises a generally rectangular shape, a top panel side, a bottom panel side and at least one storage operation hole 251 and at least one sliding section storage locking mechanism 250. The storage operation hole 251 comprises a storage operation hole radially outer edge. The left 212 and right 213 guide rails comprise a left and right outer guide rail side, a left and right inner guide rail side, a left and right top guide rail end, a left and right bottom guide rail end, a left and right front guide rail end, a left and right back guide rail end, and a tabular extension on the front guide rail end. The left 212 and right 213 guide rails comprise a plurality of stopper slots for receiving the sliding section stopper plate 280. The main support frame 200 comprises at least one sliding section unloading locking mechanism 240, and at least one unloading operation hole 241. In the first preferred embodiment, the right guide rail 213 comprises the sliding section unloading locking mechanism 240, and the unloading operation hole 241 but is not limited to the right guide rail 213. In an alternative embodiment, the left guide rail 212 could include the sliding section unloading locking mechanism 240, and the unloading operation hole 241. The unloading operation hole 241 comprises an unloading operation hole radially outer edge. The plurality of assist holes and stopper slots are aligned on the left 212 and right 213 guide rails so the assist pin and the sliding section stopper plate would be generally horizontal when apparatus is assembled. The assist pin is generally cylindrical that extended between and engages with the assist holes on the left 212 and right 213 guide rails. The assist pin is secured with a bolt or similar securement to the left 212 and right 213 guide rails. The assist pin could have a first roller bearing for assisting in the deployment and storage of the sliding section 60. The left 212 and right 213 guide rails have a left 211 and a right 219 elongated longitudinal slots, respectively, for operability of the sliding mechanism 310. The left 212 and right 213 guide rails and the main support floor panel 217 are formed from a contiguous piece of a fourth plate body by cutting to shape and simply bending of the left 212 and right 213 guide rails to be generally perpendicular to the main floor panel 217. The left 212 and right 213 guide rails are engaged with the top main plate 220 through the first and second top plate slots in the top main plate 200. The engagement for the top main plate 220 and the main support frame 200 defines a semi-enclosed main cavity to house the sliding section 60 while stored. The top main plate 220 is secured to the left 212 and right 213 guide rails by welding or similar securement. The base main frame 200 comprises a plurality of sliding rails 230. The sliding rails 230 comprise a plurality of sliding fastener holes 235. In the first preferred embodiment, the sliding rails 230 comprise a left sliding rail 231, a right sliding rail 232, and a support floor sliding rail 233. In the first preferred embodiment, the sliding rails 230 are made of neoprene and facilitate the sliding of the sliding section 60 with the base main frame 50. The left 231 and right 232 sliding rails comprise a left and a right front rail end, a left and a right back rail end, a left and a right top rail end, a left and a right bottom rail end, a left and a right inner rail side, and a left and a right outer rail side. The left and right outer rail side will mate with the left and right inner guide rail side and cover at least partially the left and right inner guide rail sides. The plurality of sliding fastener holes 235 in the sliding rails 230 will be coincidence with the plurality of guide fastener holes 2131 in the guide rails. The left and right top rail end will be coincident with a left and right bottom edge of the left 211 and right 219 elongated longitudinal slots. The support floor sliding rail 233 comprises a sliding floor panel having a generally rectangular shape and covers at least partially the top panel side. In the first preferred embodiment, the material of the sliding rails is neoprene but is not limited to neoprene. In alternative embodiments, material could be made of synthetic rubbers other than neoprene or similar materials. In the first preferred embodiment, the guide 2131 fasteners are double-sided bolts but are not limited to these. The heads of the bolts can be countersunk into the sliding rails to improve operability. In one alternative embodiment, the left 212 and right 213 guide rails comprise a sliding section assist mechanism, and a plurality of assist holes. The sliding assist mechanism comprises at least one assist pin, and an assist roller bearing but is not limited to this.

Referring to FIGS. 1-5, FIGS. 7 and 8, and FIGS. 13 and 14, the sliding support frame 300 of the sliding section 60, comprises a first u-channel frame having two lateral vertical sides and a back support panel, an open top end, a bottom end, a front support end, and a back support end. The sliding support frame comprises a generally rectangular shaped back support panel, and a support frame tongue 302 on the front support end. The support frame tongue 302 comprises an extension of the sliding support frame and a support panel hole 303 for engagement with the sliding section storage locking mechanism 250. The lateral vertical sides of the sliding support frame 300 comprise a plurality of sliding holes for attachment of the sliding mechanism 310. The sliding mechanism 310 comprises a left lateral pin having a left inner end and a left pin outer end, a right lateral pin having a right inner end and a right outer end, a second roller bearing, a third roller bearing, a left attachment ring 313, and a right attachment ring 316. The pins are to be inserted at least partially into the sliding holes for the sliding mechanism and are coincidental so both pins are longitudinally in line with each other. The left and right inner ends of the pins are engaged with the left 313 and right 316 attachment rings and are secured by welding or similar securement. The sliding pins are slidably engaged to the elongated longitudinal slots of the guide rails of the main support frame 200. The second and third roller bearings are secured to the left and right pin outer ends and are operably engaged with the periphery of the bottom plate side of the top plate 220. The attachment support frame comprises the said shape with gaps 123 between the attachment support frame 120 and the base main frame 50 in line with the guide rail slots as described below to allow the operability of the sliding mechanism 310. The sliding section 60 can also comprise a sliding section cross support 350. The sliding support frame 300 comprise a plurality of support slots and an unloading locking hole 304. The sliding section cross support 350 is generally rectangular with tabular protrusions to engage with the support slots in the sliding support frame and secured by welding or similar securement. The sliding section bracket 320 comprises a left bracket side 321 and right bracket side 322 both having circular central portion with a central hole, a radial upper extension, a trapezoidal lower extension with a lip extending out past the central portion of the sliding section bracket, and a bracket cap 323. The head section stopper plate 330 will extend between each lip of the left and the right bracket sides of the sliding section bracket. The bracket cap 323 caps the left and right radial upper extension. In the first preferred embodiment, the bracket cap comprises an unloading bracket hole 3231 and a storage bracket hole 3232 for engagement of the head section locking mechanism 430 as described below. The sliding section bracket 320 being secured to the sliding support frame 300 by welding or similar securement.

Referring to FIGS. 1-10 and FIGS. 15 and 16, the main trough 400 of the head section 70 comprises a second u-channel having front and back sides, a trough back panel, a first outer front surface, an open top side for receiving a crossbar of the tow dolly apparatus. The head section bracket 410 comprises a left bracket side 406 and a right bracket 407, and a top cap 408 and a top side. The top cap 408 comprises a cap hole 409 for the engagement of the head section locking mechanism 430 as described below. The cap hole 409 comprises a cap hole radially outer edge. The left head bracket side 406 and right head bracket sides 407 comprise a left and right notched step top side with a plurality of a left and right notched steps, a left and right head bracket front end having a left and right bracket front end edge, a left and right head bracket back side, and at least one side hole for securing the head section bracket 410 to the sliding section bracket 320. The top cap 408 is secured to the top side of the head section bracket spanning between the left 406 and right 407 right head brackets. The main trough 400 is secured to a lower step of the head section bracket 410 spanning between the left and right bracket sides and extending at least partially past either side and is secured by welding or similar securement and forms a main trough junction with the head section bracket 410. The lower notched step can have a central tabular protrusion. In the preferred embodiment, the main trough 400 comprises of a plurality of central tabular cavities that can mate with the central tabular protrusions for improved strength and stability of the main trough junction. In the first preferred embodiment, the main trough 400 comprises a flange extension 401, a front plate 452, a locking bar mechanism 420, a lowering handle 440, a crossbar handle 450, and a central notch 404. The locking bar mechanism comprises a locking bar 421, a left locking bar guide rail 422 and a right locking bar guide rail 423. The flange extension 401 comprises a tabular extension of the vertical back side of the main trough 400 that is generally perpendicular to the vertical back side on the open top side, extending to the back side of the main trough 400 with at least one locking hole 428 for engagement with a locking mechanism for the locking bar 421. The locking mechanism for the locking bar 421 can be a lockable padlock with a key or similar locking devices. The front plate 452 comprises a generally rectangular fifth plate body having a top end with a top notch, a left extension member and a right extension member, second outer surface, and a second inner surface. The front plate 452 is secure to the bracket front end edge and the main trough 400 by welding or similar securement. The crossbar handle 450 comprises a rod 451 that extends between ends of the left and right extension members thereby defining a front plate cavity to assist in gripping the crossbar handle and is secured to the front plate by welding or similar securement. The locking bar 421 comprises a sixth plate body that is generally rectangular with a locking side, and an attachment side having an attachment end, and a locking bar hole 429. The locking side is generally rounded but not limited to this and includes the locking bar hole 429 for engagement with the locking mechanism and the locking hole 428 of the flange extension 401. The attachment side of the locking bar has a generally cylindrical ring 425 secured to the attachment end by welding or similar securement. The ring 425 comprises an outer rim defining an inner cavity. The inner cavity receives an attachment tube 424 that extends between the left 422 and right 423 locking bar guide rails. The attachment tube can be slidably attached to the left 422 and right 423 locking bar guide rails. In one alternative embodiment, the attachment side end is formed by curving the end until the attachment side has been curved against itself to define a generally cylindrical locking bar pin cavity that can receive the attachment tube 424. The central notch 404 is a cutout of the front side of the main trough for the operability of the locking bar. In the first preferred embodiment, the left locking bar guide rail 422 comprises a generally trapezoidal seventh plate body having a left guide front end, a left guide back end having a left back-end edge, a left guide top end, a left guide bottom end having a left bottom end edge, and a left guide longitudinal slot. The right locking bar guide rail 423 comprises a generally trapezoidal eighth plate body having a right guide front end, a right guide back end having a right guide back-end edge, a right guide top end, a right guide bottom end having a right bottom end edge, and a right guide longitudinal slot. The guide back-end edge of both the left 422 and right 423 locking bar guide rails coincide with the first outer surface of the main trough 400 and the second outer surface of the front plate 452 to secure the left 422 and right 423 locking bar guide rails to the main trough 400 and the front plate 452 by welding or similar securement. In the first preferred embodiment, the lowering handle 440 comprises a handle plate 441, a left 443 brace and a right 444 brace for supporting the handle plate 441, and a handle grip 442. The handle plate 441 comprises a ninth generally rectangular plate body with a left extension arm and a right extension arm, and the handle grip 442 extending between the left and right extension arms defining a handle plate cavity for assisting in gripping the handle grip 442. The handle plate 441 comprises a handle end, a securing end having a securing end edge, a top surface, and a bottom surface. The securing end edge is secured to the front plate outer surface and the securing end of the top surface is secured to the left and right bottom end edge of the left 422 and right 423 locking bar guide rails. The handle grip 442 could have a grabbable surface which comprises a gripping material. The left 443 and right 444 braces comprise a tenth and eleventh plate body that are generally triangular in shape having a front end, a back brace end having a back brace end edge, and a top brace end having a top brace end edge. The back brace end edge is secured to the second outer surface and the top brace end edge is secured to the handle plate bottom surface by welding or similar securement. In the first preferred embodiment, the left 443 and right 444 braces comprise the said plate bodies with each having a brace cavity to decrease the weight of the components.

In the first preferred embodiment, the sliding section unloading mechanism 240 comprises an unloading cam lock, the sliding section storage locking mechanism 250 comprises a storage cam lock, and the head section locking mechanism 430 comprises a head cam lock. Each of the three cam locks comprises a housing cylinder, a piston, a piston spring, and a disengaging handle. The housing cylinder comprises a cylinder body defining a piston cavity for receiving the piston with a closed piston end and an open locking end, a handle hole for receiving the disengaging handle. The piston comprises a piston cylinder with a spring end and a locking end. The housing cylinder receives the piston spring and the piston spring end at least partially so the locking end of the piston could be partially exposed. The piston and piston spring are in contact with the piston spring in tension so as to push the piston so the locking end of the piston partial exposed so if the cam lock is engaged with apparatus the piston locking end engages with an operation hole. The disengaging handle is operably engaged with the piston so when rotated, the piston is retracted further into the piston cavity, compressing the piston spring. The disengaging handle is rotated in said manner until the locking end of the piston is retracted to disengage the piston with said locking hole of the apparatus. In alternative embodiments, a latch or other locking devices could be used. The cam locks are secured to the apparatus by welding of similar securement of the housing cylinder to the apparatus. The unloading cam lock, the storage cam lock, and the head cam lock can be secured to the radially outer edge of the unloading operation hole 241, the storage operation hole 251, and the cap hole 409, respectively, by welding, or similar securement, the housing cylinder of each cam lock to the periphery of the radially outer edge.

Figure 2:
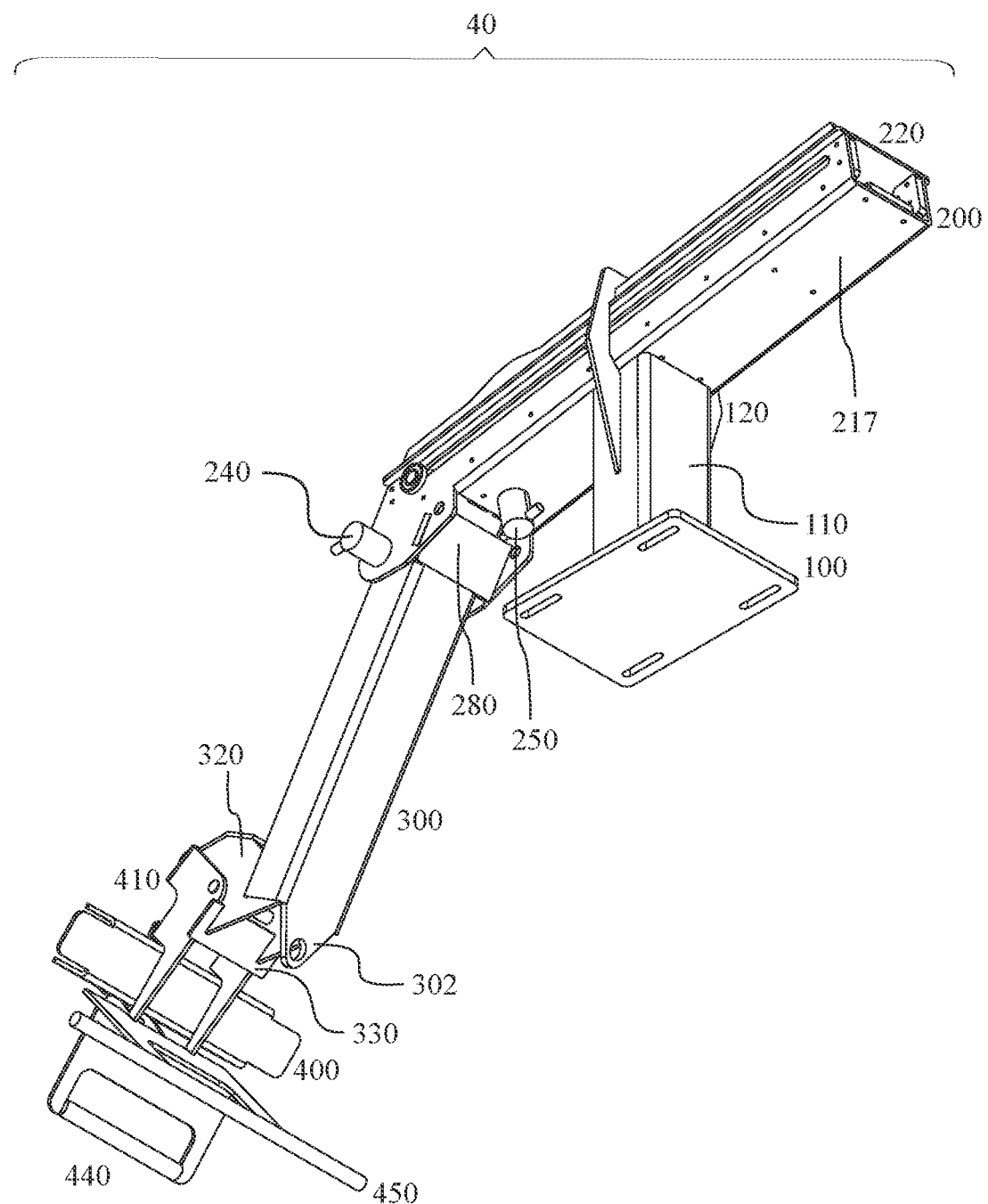
FIG. 2 is a bottom rear perspective view of the present invention in unloading position.
Figure 3:
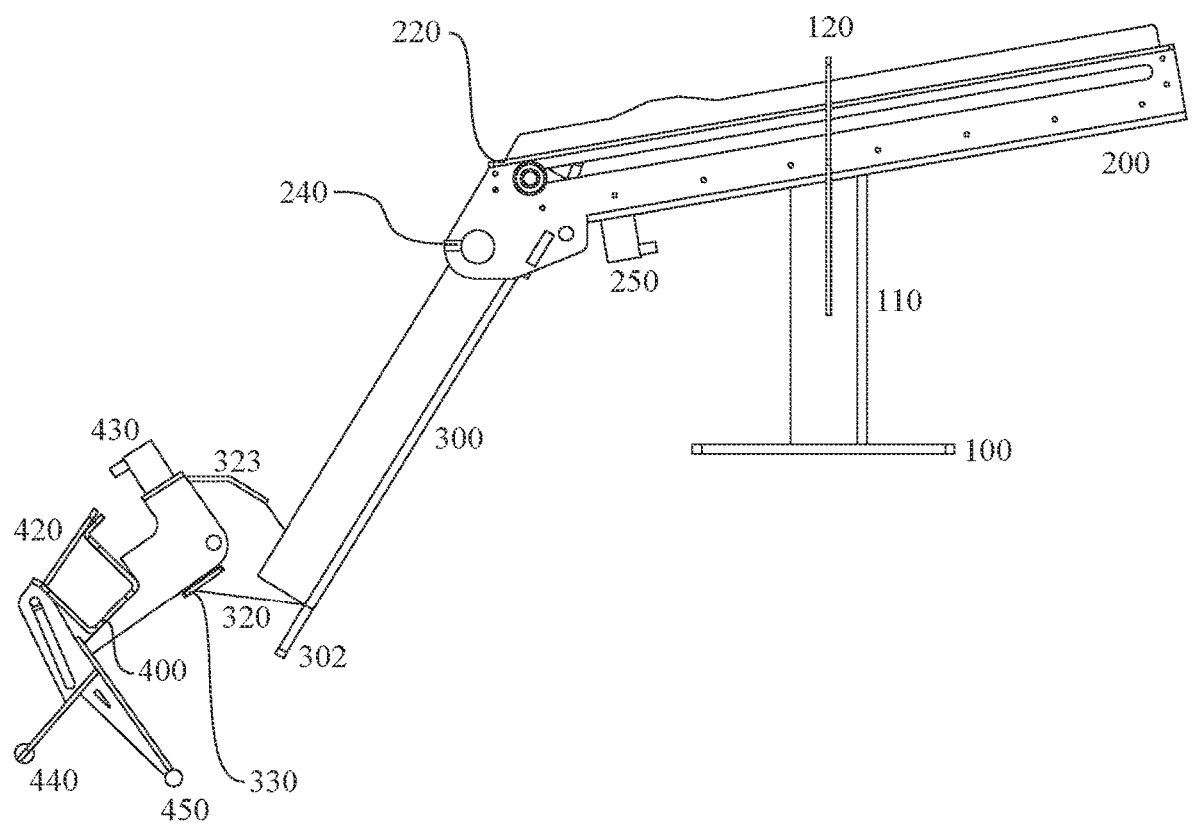
FIG. 3 is a right view of the present invention in unloading position.
Figure 4:
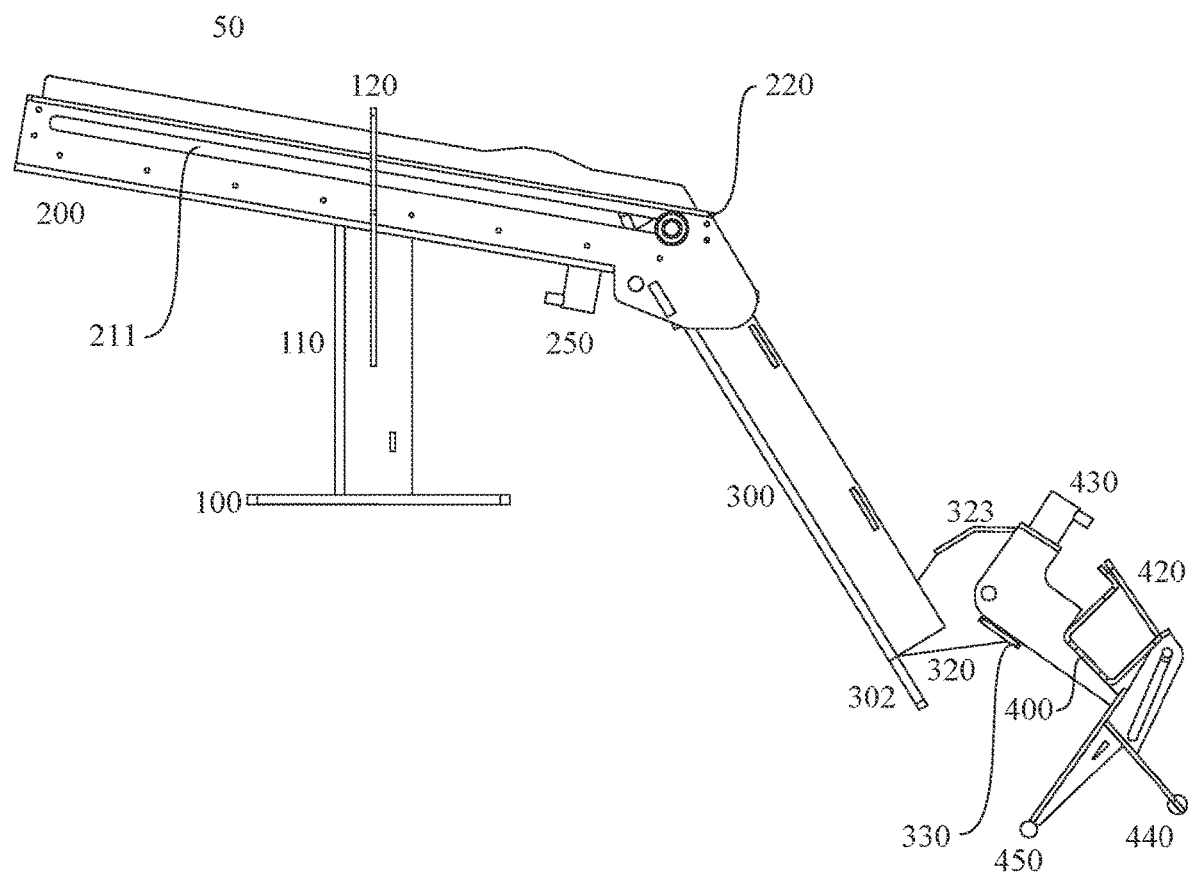
FIG. 4 is a left view of the present invention in unloading position.
Figure 5:
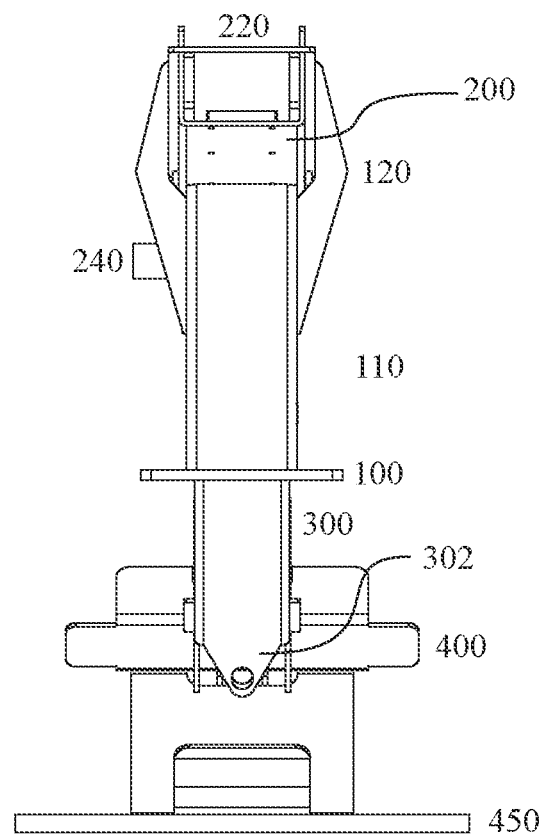
FIG. 5 is a rear view of the present invention in unloading position.
Figure 6:
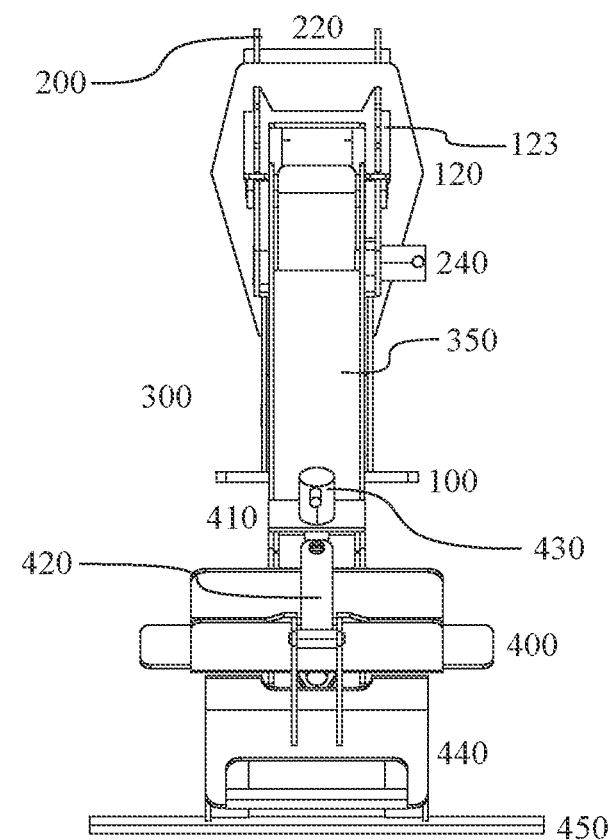
FIG. 6 is a front view of the present invention in unloading position.
Figure 7:
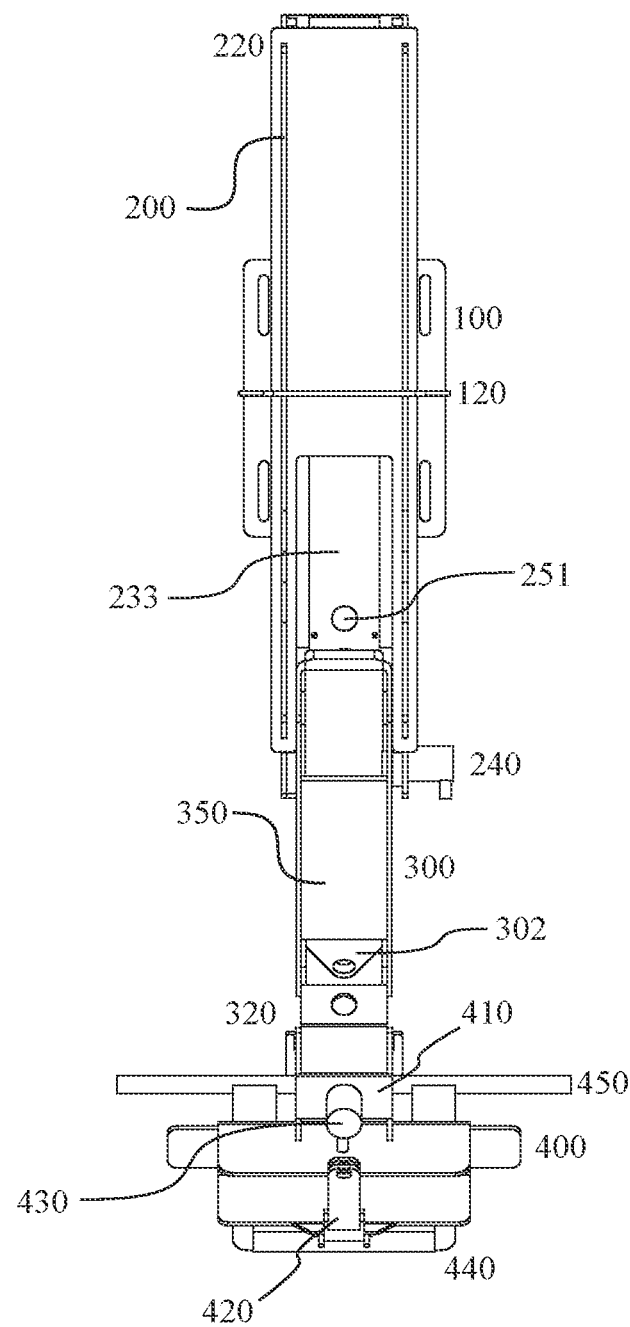
FIG. 7 is a top view of the present invention in unloading position.
Figure 8:
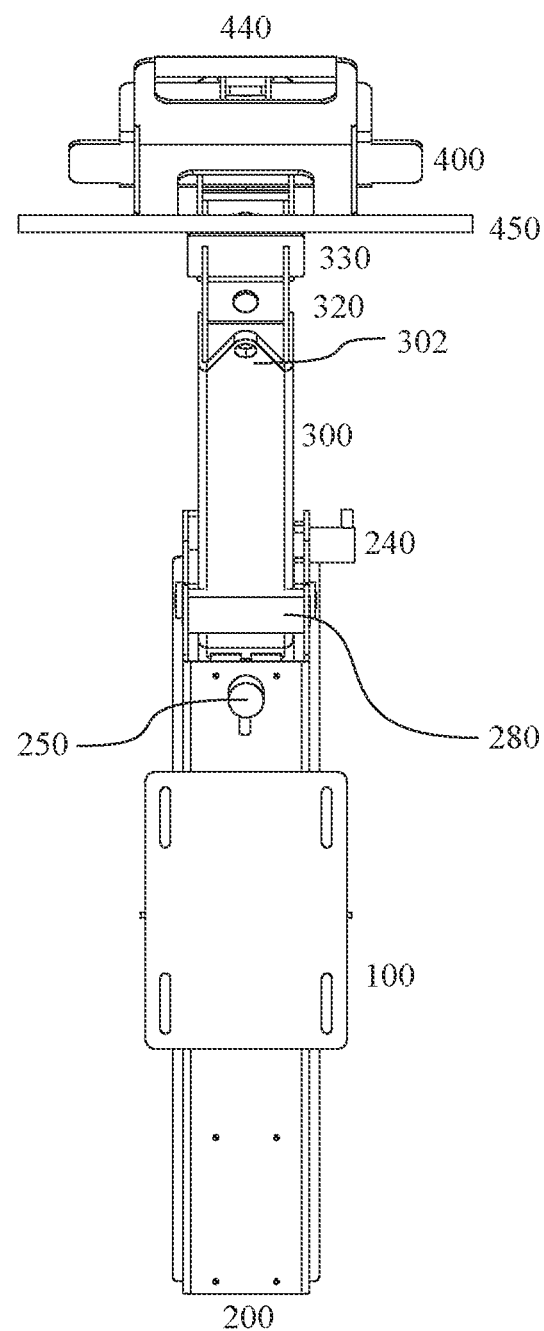
FIG. 8 is a bottom view of the present invention in unloading position.
Figure 9:
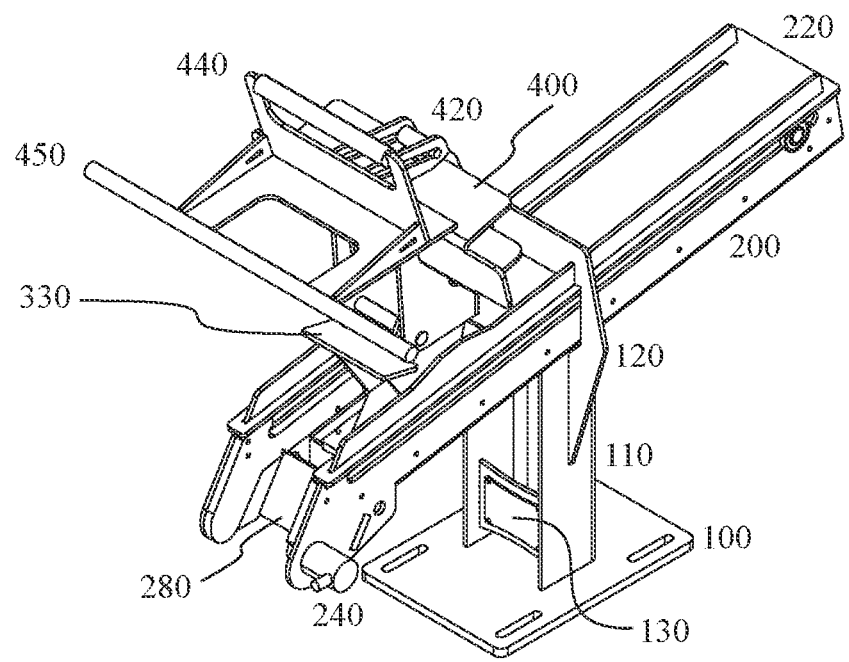
FIG. 9 is a top front perspective view of the present invention in storage position.
Figure 10:
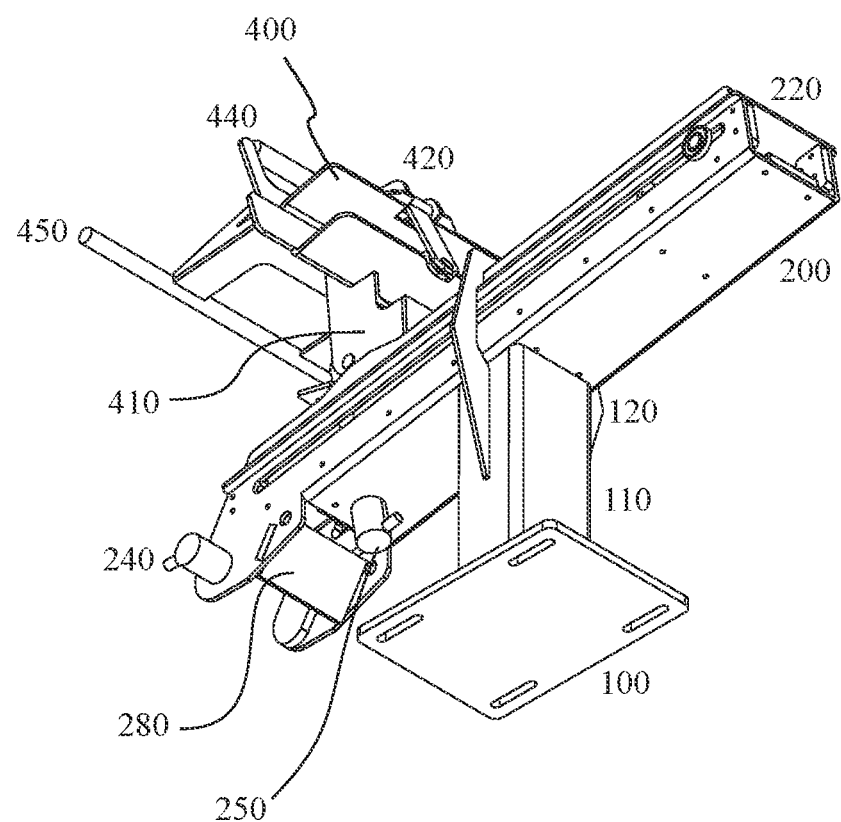
FIG. 10 is a bottom rear perspective view of the present invention in storage position.
Figure 11:
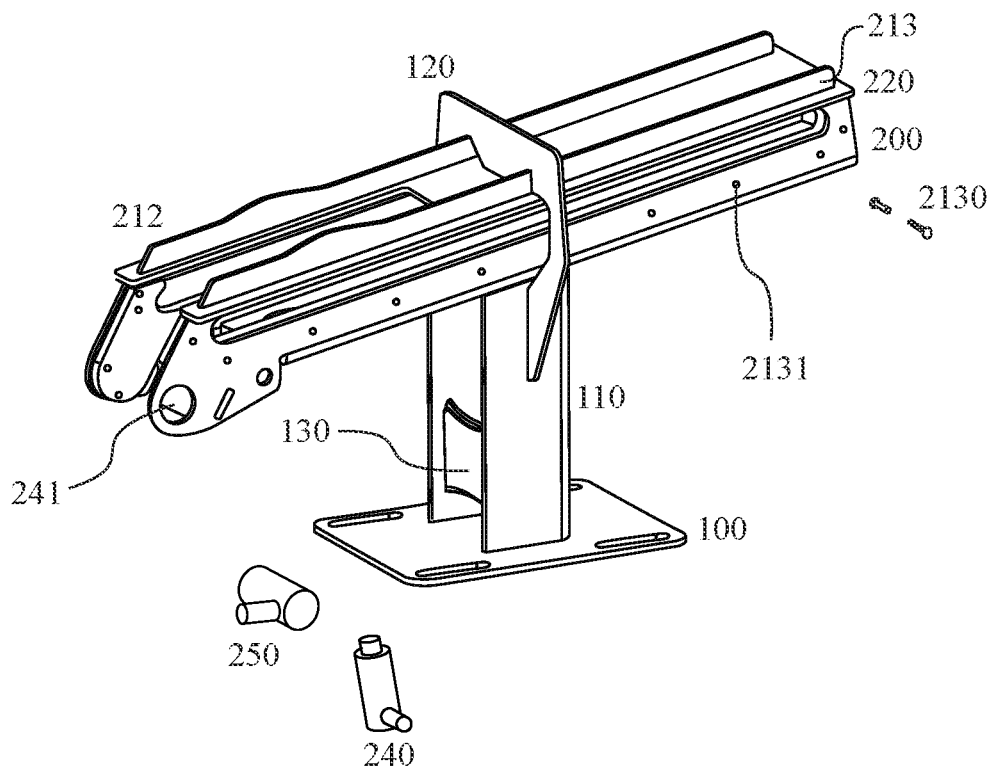
FIG. 11 is a perspective view of the stand section and the base main frame.
Figure 12:
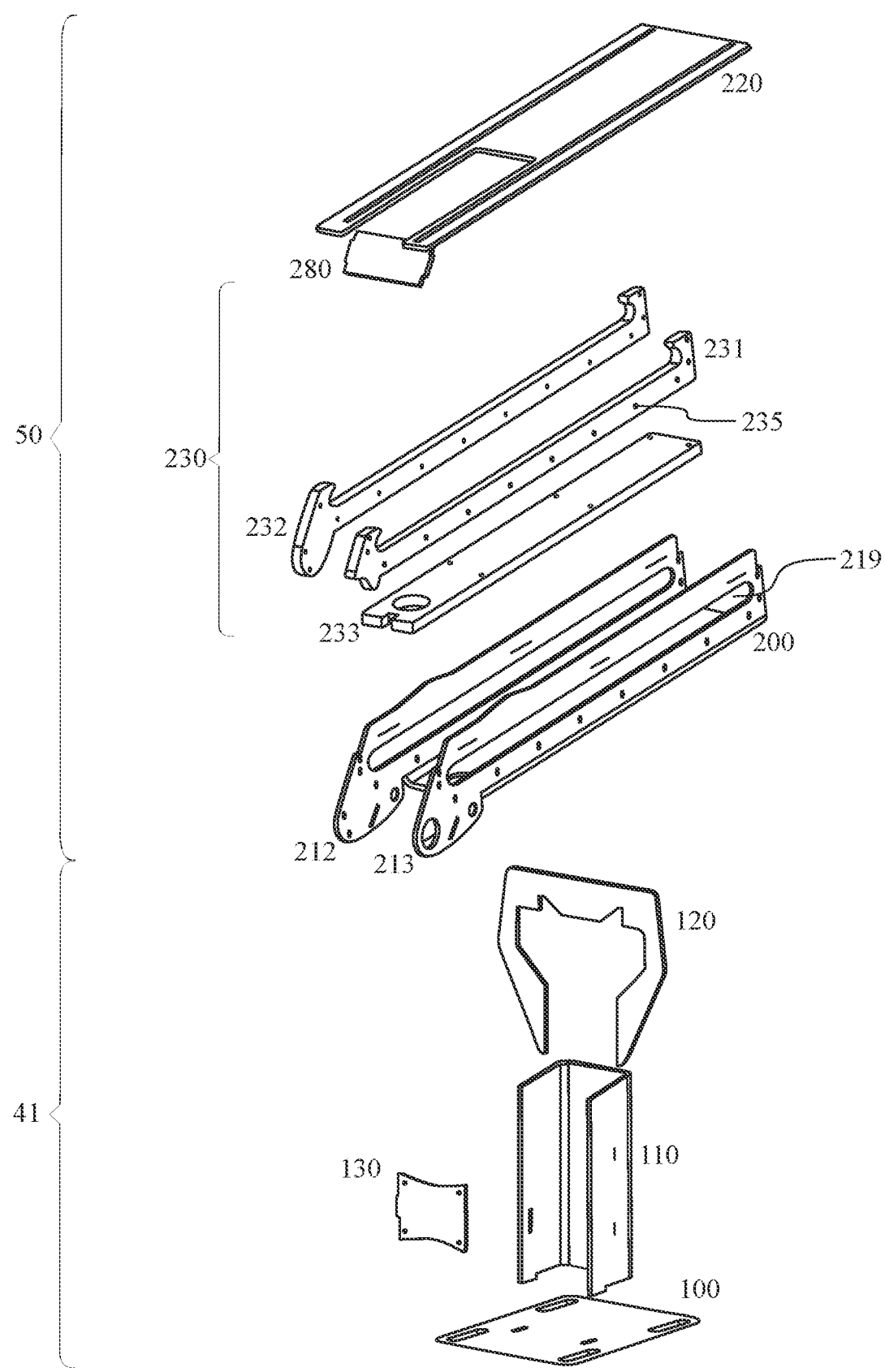
FIG. 12 is an exploded view of the stand section and the base main frame.
Figure 13:
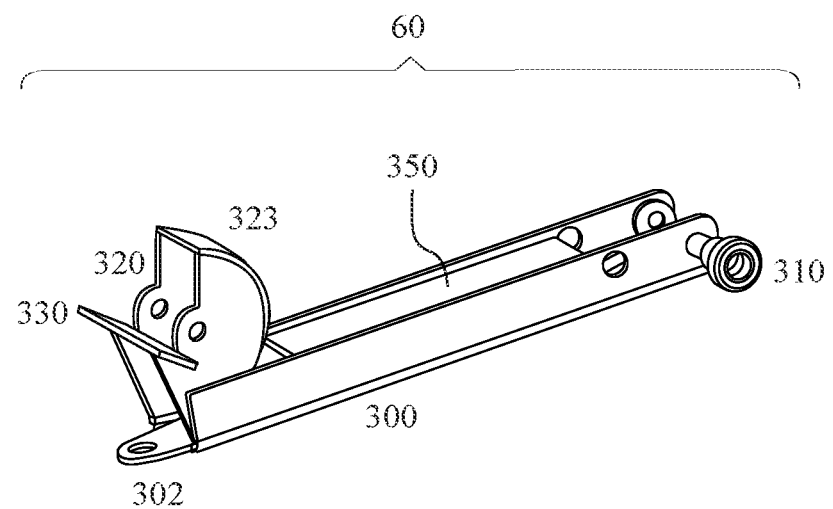
FIG. 13 is a perspective view of the sliding section.
Figure 14:
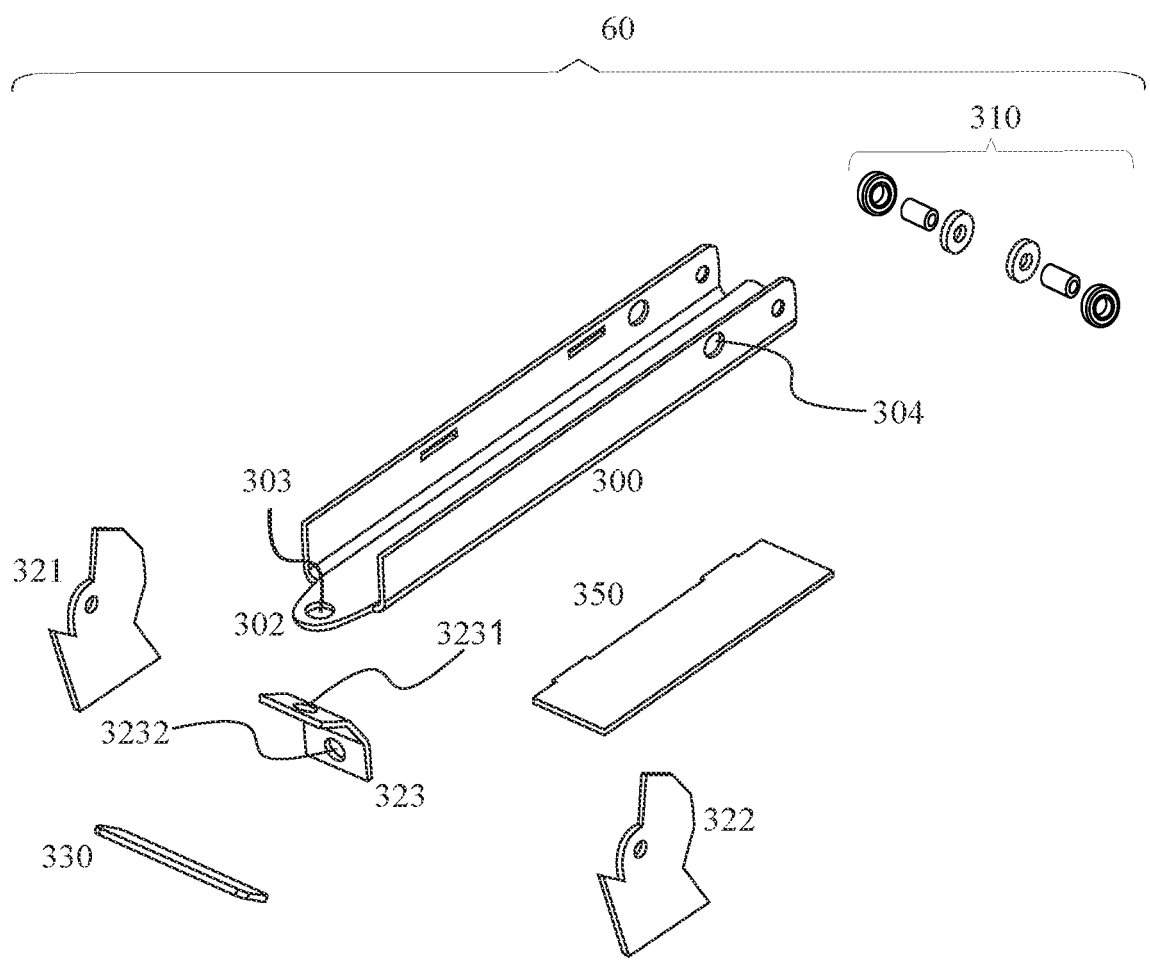
FIG. 14 is an exploded view of the sliding section.
Figure 15:
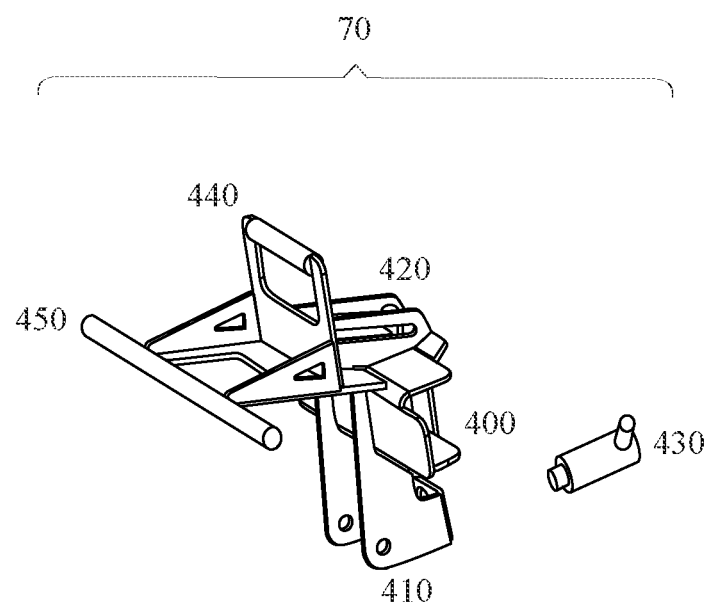
FIG. 15 is a perspective view of the head section.
Figure 16:
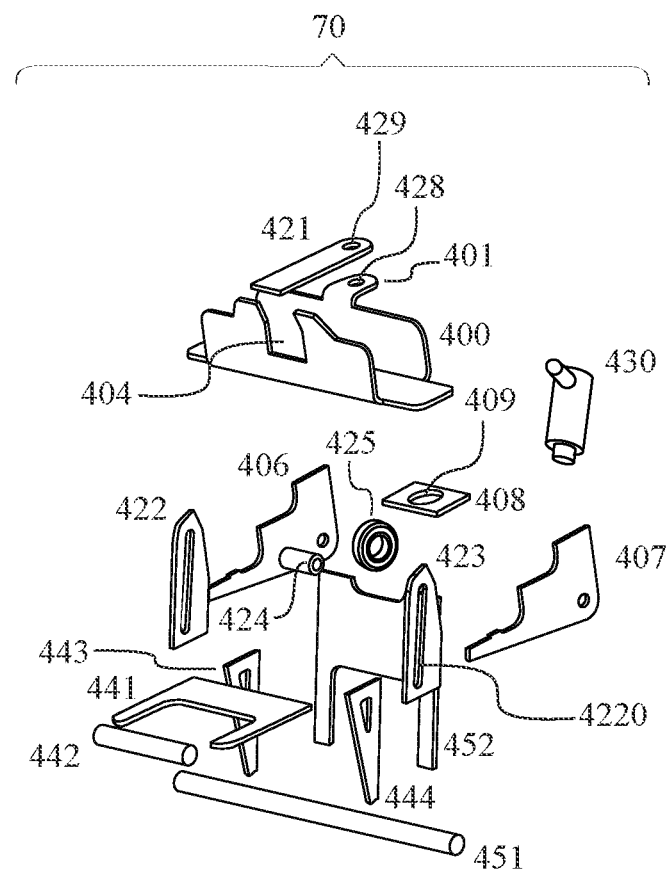
FIG. 16 is an exploded view of the head section.

The tow dolly mount 40 comprises a storage position and an unloading position. The unloading position, as shown in FIGS. 1 and 2, is when the sliding section 60 is extended away from the base main frame 50 and lowered until engaged with the sliding section stopper plate 280 as well as the sliding section unloading locking mechanism 240 is engaged with the unloading locking hole 304. The head section 70 is pivoted downward and engaged with the head section stopper plate 330 as well as the head section locking mechanism 430 is engaged with the unloading bracket hole 3231. In this position, the locking mechanism can be disengaged, and the locking bar 421 raised and the tow dolly can be extracted from the main trough. The storage position, as shown in FIGS. 9 and 10, is when the head section 70 is pivoted upward until the head section locking mechanism 430 is engaged with the storage bracket hole 3232 in the bracket cap 323. The sliding 60 and the head section 70 are raised so the sliding section 60 is longitudinally in line with the semi-enclosed main cavity and the sliding section 60 is received into the main cavity at least partially until the sliding section storage locking mechanism 250 is engaged with the support panel hole 303 in the support frame tongue 302. A plurality of head section supports could also be attached to the left 212 and right 213 guide rails above the top plate 220 to give structural support with the head section 70 in the storage position. The head section support comprises a generally trapezoidal shaped material with at least one support fastener hole and at least one support fastener. In the first preferred embodiment, the head section support material is neoprene but not limited to this.

Although the invention has been explained in relation to its preferred embodiment, it is to be understood that many other possible modifications and variations can be made without departing from the spirit and scope of the invention.

What is claimed is:

1. A tow dolly mount comprises,
  a stand section;
  a base main frame;
  a sliding section;
  a head section;
  the stand section comprises a mounting platform,
    at least one support leg,
    at least one support cross brace, and
    an attachment support frame;
  the base main frame comprises a main support frame,
    a top main plate and a sliding section stopper plate,
    the sliding section comprises a sliding section cross support, and
    a head section stopper plate;
  the main support frame comprises a main support floor panel, a left guide rail, and
a right guide rail;
the left guide rail comprises a left elongated longitudinal slot;
the right guide rail comprises a right elongated longitudinal slot;
the sliding section comprises a sliding support frame,
a sliding mechanism, and
a sliding section bracket; and
the head section comprises a main trough, and
a head section bracket.

2. The tow dolly mount as claimed in claim 1 comprises,
the head section comprises a lowering handle, and
a crossbar handle.

3. The tow dolly mount as claimed in claim 1 comprises,
the base main frame comprises a plurality of sliding rails,
a plurality of guide fastener holes, and
a plurality of guide fasteners; and
the sliding rails comprise a plurality of sliding fastener holes.

4. The tow dolly mount as claimed in claim 1 comprises,
the main support floor panel comprises at least one sliding section storage locking mechanism, and
at least one storage operation hole;
the sliding support frame comprises a support frame tongue;
the support frame tongue comprises a support panel hole.

5. The tow dolly mount as claimed in claim 4 comprises,
the head section comprises a lowering handle, and
a crossbar handle.

6. The tow dolly mount as claimed in claim 4 comprises,
the base main frame comprises a plurality of sliding rails,
a plurality of guide fastener holes, and
a plurality of guide fasteners;
the sliding rails comprise a plurality of sliding fastener holes.

7. The tow dolly mount as claimed in claim 4 comprises,
the main support frame comprises at least one sliding section unloading locking mechanism, and
at least one unloading operation hole;
the sliding support frame comprises an unloading locking hole;
the sliding section bracket comprises a bracket cap;
the bracket cap comprises an unloading bracket hole, and
a storage bracket hole;
the head section comprises a head section locking mechanism, and
a locking bar mechanism;
the head section bracket comprises a top cap; and
the top cap comprises a cap hole.

8. The tow dolly mount as claimed in claim 7 comprises,
the main trough comprises a central notch, and
a flange extension;
the flange extension comprises a locking hole; and
the locking bar mechanism comprises a locking bar,
a left locking bar guide rail, and
a right locking bar guide rail.

9. The tow dolly mount as claimed in claim 7 comprises,
the head section comprises a lowering handle and
a crossbar handle.

10. The tow dolly mount as claimed in claim 7 comprises,
the base main frame comprises a plurality of sliding rails,
a plurality of guide fastener holes, and
a plurality of guide fasteners; and
the sliding rails comprise a plurality of sliding fastener holes.

11. The tow dolly mount as claimed in claim 7 comprises,
the sliding section storage locking mechanism comprises a storage cam lock;
the sliding section unloading locking mechanism comprises an unloading cam lock; and
the head section locking mechanism comprises a head cam lock.

12. A tow dolly mount comprises,
a stand section;
a base main frame;
a sliding section;
a head section;
the stand section comprises a mounting platform,
at least one support leg,
at least one support cross brace, and
an attachment support frame;
the base main frame comprises a main support frame,
a top main plate,
a sliding section stopper plate;
the main support frame comprises a main support floor panel,
a left guide rail, and
a right guide rail;
the left guide rail comprises a left elongated longitudinal slot;
the right guide rail comprises a right elongated longitudinal slot;
the main support floor panel comprises at least one sliding section storage locking mechanism, and
at least one storage operation hole;
the sliding section comprises a sliding support frame,
a sliding mechanism,
a sliding section bracket,
a head section stopper plate,
a sliding section cross support;
the sliding support frame comprises a support frame tongue;
the sliding section bracket comprises a bracket cap;
the bracket cap comprises an unloading bracket hole and
a storage bracket hole;
the support frame tongue comprises a support panel hole; and
the head section comprises a main trough,
a head section bracket,
a locking bar mechanism,
a head section locking mechanism;
the head section bracket comprises a top cap; and
the top cap comprises a cap hole.

13. The tow dolly mount as claimed in claim 12 comprises,
the main support frame comprises at least one sliding section unloading locking mechanism,
at least one unloading operation hole;
the sliding support frame comprises an unloading locking hole;
the main trough comprises a central notch, and
a flange extension;
the locking bar mechanism comprises a locking bar, and
a left locking bar guide rail, and
a right locking bar guide rail; and
the flange extension comprises a locking hole.

14. The tow dolly mount as claimed in claim 13 comprises,
the sliding section storage locking mechanism comprises a storage cam lock;

the sliding section unloading locking mechanism comprises an unloading cam lock;
the head section locking mechanism comprises a head cam lock.

15. The tow dolly mount as claimed in claim 12 comprises,
the head section comprises a lowering handle, and
a crossbar handle.

16. The tow dolly mount as claimed in claim 12 comprises,
the base main frame comprises a plurality of sliding rails,
a plurality of guide fastener holes, and
a plurality of guide fasteners; and
the sliding rails comprise a plurality of sliding fastener holes.

17. A tow dolly mount comprises,
a stand section;
a base main frame;
a sliding section;
a head section;
the stand section comprises a mounting platform,
at least one support leg,
at least one support cross brace,
an attachment support frame;
the base main frame comprises a main support frame,
a top main plate, and
a sliding section stopper plate;
the main support frame comprises a main support floor panel,
a left guide rail,
a right guide rail,
a sliding section unloading locking mechanism,
at least one unloading operation hole;
the left guide rail comprises a left elongated longitudinal slot;
the right guide rail comprises a right elongated longitudinal slot;
the main support floor panel comprises at least one sliding section storage locking mechanism, and
at least one storage operation hole;
the sliding section comprises a sliding support frame,
a sliding mechanism,
a sliding section bracket,
a head section stopper plate,
a sliding section cross support; and
the sliding support frame comprises a support frame tongue, and
an unloading locking hole;
the sliding section bracket comprises a bracket cap;
the bracket cap comprises an unloading bracket hole and
a storage bracket hole;
the support frame tongue comprises a support panel hole; and
the head section comprises a main trough,
a head section bracket,
a locking bar mechanism,
a head section locking mechanism,
a lowering handle, and
a crossbar handle;
the main trough comprises a central notch, and
a flange extension;
the flange extension comprises a locking hole;
the head section bracket comprises a top cap;
the top cap comprises a cap hole; and
the locking bar mechanism comprises a locking bar,
a left locking bar guide rail, and
a right locking bar guide rail.

18. The tow dolly mount as claimed in claim 17 comprises,
the sliding section storage locking mechanism comprises a storage cam lock;
the sliding section unloading locking mechanism comprises an unloading cam lock; and
the head section locking mechanism comprises a head cam lock.

19. The tow dolly mount as claimed in claim 17 comprises,
the base main frame comprises a plurality of sliding rails,
a plurality of guide fastener holes, and
a plurality of guide fasteners; and
the sliding rails comprise a plurality of sliding fastener holes.

* * * * *